US009390576B2

(12) United States Patent
Hancock et al.

(10) Patent No.: US 9,390,576 B2
(45) Date of Patent: Jul. 12, 2016

(54) ROBOTIC PACKAGE LIFTING ASSEMBLY AND METHOD

(75) Inventors: Stephen H. Hancock, Wake Forest, NC (US); Norman B. Desrosiers, Oxford, NC (US); Eric Fiest, Raleigh, NC (US); John Rupert, Raleigh, NC (US)

(73) Assignee: Flextronics, AP LLC, San Jose, CA (US)

( * ) Notice: Subject to any disclaimer, the term of this patent is extended or adjusted under 35 U.S.C. 154(b) by 503 days.

(21) Appl. No.: 13/563,158

(22) Filed: Jul. 31, 2012

(65) Prior Publication Data

US 2014/0037417 A1 Feb. 6, 2014

(51) Int. Cl.
*G06F 7/00* (2006.01)
*G07F 11/16* (2006.01)
*G07F 11/26* (2006.01)

(52) U.S. Cl.
CPC .............. *G07F 11/165* (2013.01); *G07F 11/26* (2013.01)

(58) Field of Classification Search
USPC .......................................................... 700/213
See application file for complete search history.

(56) References Cited

U.S. PATENT DOCUMENTS 3,750,804 A * 8/1973 Lemelson ..................... 414/276
4,519,522 A * 5/1985 McElwee ................ G07F 11/54 221/13
5,139,384 A * 8/1992 Tuttobene ............... G07F 7/069 221/88
5,328,316 A * 7/1994 Hoffmann ............ B65G 1/0435 187/404
5,421,685 A * 6/1995 Elmer et al. .................. 414/280
2005/0069400 A1* 3/2005 Dickey ................. G11B 17/225 414/277
2009/0143906 A1* 6/2009 Blust et al. .................... 700/241
2010/0089941 A1* 4/2010 Connier et al. ............... 221/123
2010/0272546 A1* 10/2010 Wolkerstorfer ...... B65G 1/0435 414/277
2011/0160900 A1* 6/2011 Morita .......................... 700/228
2012/0201642 A1* 8/2012 Fujita ................... B65G 1/0435 414/751.1

FOREIGN PATENT DOCUMENTS

EP 2345605 A1 7/2011

OTHER PUBLICATIONS

International Search Report and Written Opinion for PCT/US2013/052682, dated Oct. 24, 2013, 8 pp.

* cited by examiner

*Primary Examiner* — Kyle Logan
(74) *Attorney, Agent, or Firm* — Volpe and Koenig, P.C.

(57) ABSTRACT

Described herein are a robotic distribution apparatus, system and method. The robotic distribution system may include a Package Delivery Kiosk (PDK), associated frontend and backend package delivery management systems, a package inventory management system. The PDK includes a Robotic Package Lifting Assembly which may be configured to remember the location of packages and slots and provide for automated retrieval and placement of the packages. In an embodiment, a package retrieving apparatus includes a track, a base slidably interconnected with the track, and a vertical support interconnected with the base. The apparatus includes a package picker module oriented on the vertical support to vertically move on the vertical support. The package picker module including a conveyer belt oriented in a plane parallel to the ground and first and second grippers oriented parallel to the conveyer belt to surround and grip an object beyond the surface of the conveyer belt.

21 Claims, 8 Drawing Sheets

ROBOTIC PACKAGE LIFTING ASSEMBLY AND METHOD

CROSS REFERENCE TO RELATED APPLICATIONS

This application is related to co-pending application Ser. No. 13/563,255 entitled "SHELVING AND KIOSK SYSTEM", filed concurrently herewith; co-pending application Ser. No. 13/563,317 entitled "AUTOMATIC PACKAGE DELIVERY AND RETRIEVAL SYSTEM", filed concurrently herewith; co-pending application entitled "ON DEMAND KIOSK COMMERCE SYSTEM AND METHOD", filed concurrently herewith; and co-pending application Ser. No. 13/563,410 entitled "PACKAGE DELIVERY KIOSK INCLUDING INTEGRATED ROBOTIC PACKAGE LIFTING ASSEMBLY WITH SHELVING SYSTEM", filed concurrently herewith, the contents of which are hereby incorporated by reference herein.

BACKGROUND

The cost associated with operating a physical store front or delivering packages via mail or other package delivery common carriers is a significant expense of doing business. The last mile of delivery of packages is many times a large percentage of the expense of delivery, especially as compared to the total distance a package travels. In some cases, individuals living in apartment type dwellings can only receive packages if they are there to physically sign for them. Considering the hours of delivery and the hours most people work, home delivery is therefore impossible. In this case the resident must go to a post office or other depot during business hours. This provides for similar difficulty.

Increasingly consumers desire immediate satisfaction of orders and purchases. In order to do so they request express shipping, (at some cost), or go to a physical store front. When going to a physical store front, the consumer may not feel as though they are getting the best prices so they may be reluctant to purchase. Consumers may return home and search on Internet shopping sites in order to obtain the best price. Also, the store may not be open or may be far away. In such cases, they delay acquisition of the item of interest.

Therefore the ability to retrieve packages in an automated fashion at remote sites accessible to the public is most desirable. One aspect of providing packages to users is providing a system to retrieve them.

BRIEF SUMMARY

Described herein are a robotic distribution apparatus, system and method. The robotic distribution system may include a Package Delivery Kiosk (PDK), associated front end and back end package delivery management systems, portals for the consumer and the retailer, portals for the common carrier, sender, and recipient, a package inventory management system, integrated retailer access, and a real and automated retailer bidding system. The PDK includes a Robotic Package Lifting Assembly which may be configured to remember the location of packages and slots and provide for automated retrieval and placement of the packages. In an embodiment, a package retrieving apparatus includes a track, a base slidably interconnected with the track, and a vertical support interconnected with the base. The apparatus includes a package picker module oriented on the vertical support to vertically move on the vertical support. The package picker module including a conveyer belt oriented in a plane parallel to the ground and first and second grippers oriented parallel to the conveyer belt to surround and grip an object beyond the surface of the conveyer belt.

BRIEF DESCRIPTION OF THE FIGURES

A more detailed understanding may be had from the following description, given by way of example in conjunction with the accompanying drawings wherein.

DETAILED DESCRIPTION

Figure 1:
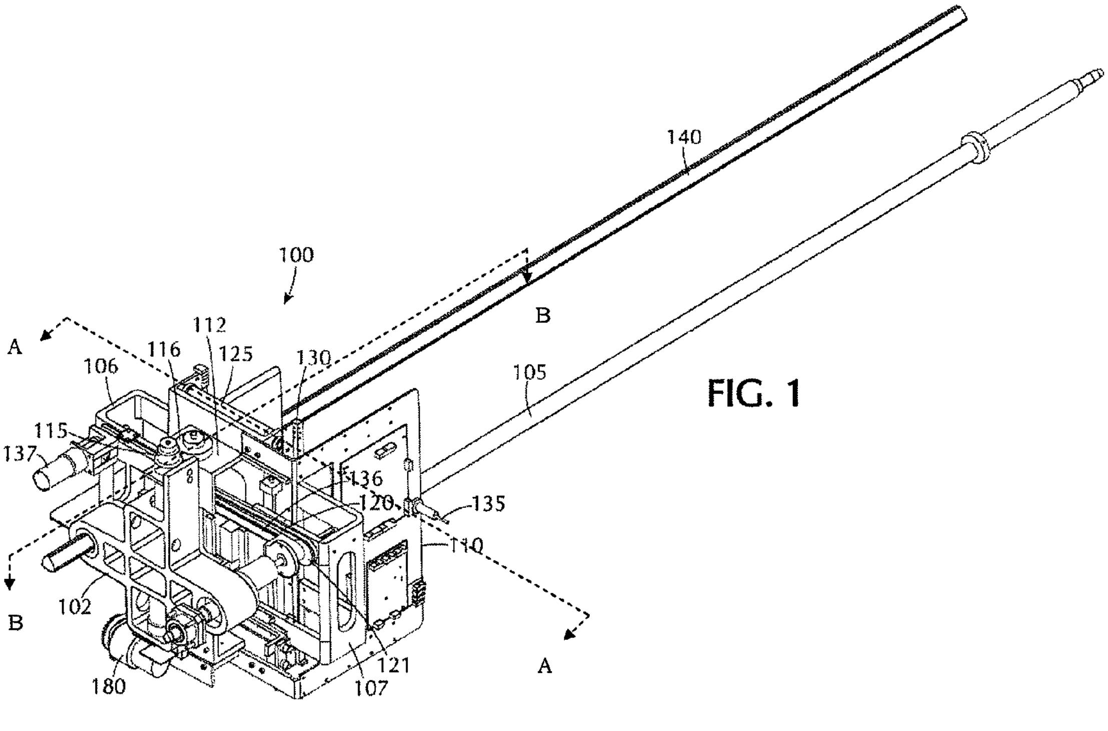
FIG. 1 shows a perspective view of one embodiment of a lifting portion of a Robotic Package Lifting Assembly (RPLA)

Certain terminology is used herein for convenience only and is not to be taken as a limitation on the embodiments of a Robotic Package Lifting Assembly (RPLA). In the drawings, the same reference letters are employed for designating the same elements throughout the several figures.

The words "right", "left", "front", and "back" designate directions in the drawings to which reference is made. The words "inwardly" and "outwardly" refer to directions toward and away from, respectively, the geometric center of the case with flexible body portion and designated parts thereof. The terminology includes the words above specifically mentioned, derivatives thereof, and words of similar import. The drawings are proportional.

Like reference numerals designate like or corresponding parts throughout the various views and with particular reference to each of Figs. as delineated below.

Figure 1A:
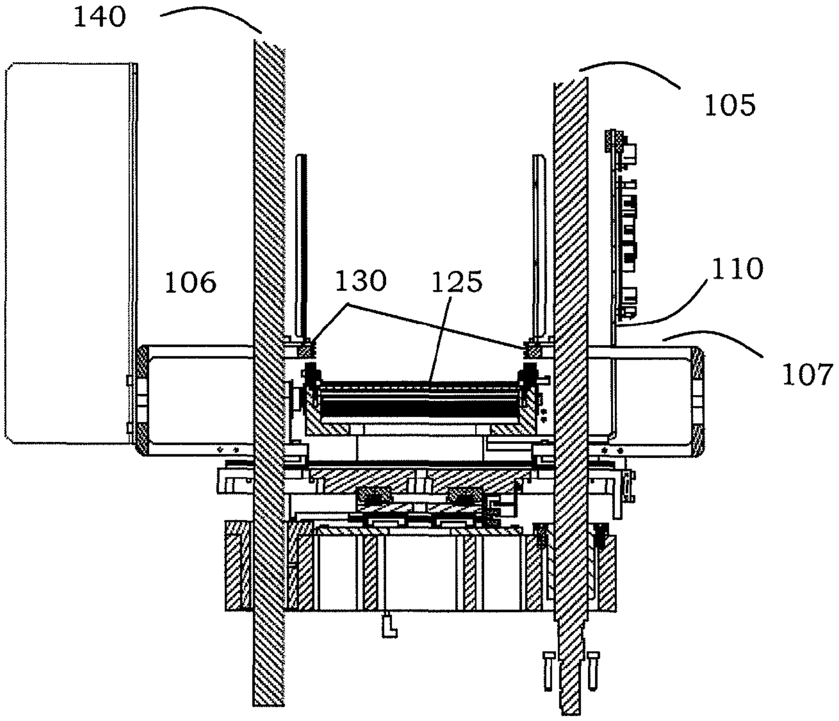
FIG. 1A shows a cross-sectional view of the embodiment of FIG. 1 taken along line A-A.
Figure 1B:
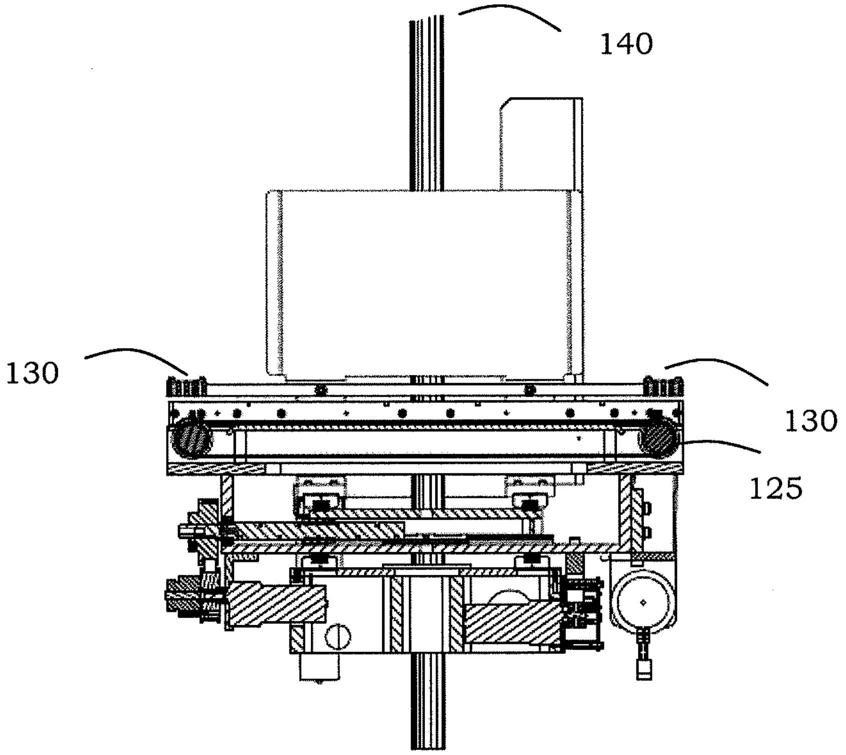
FIG. 1B shows a cross-sectional view of the embodiment of FIG. 1 taken along line B-B.

FIG. 1 shows a perspective view of one embodiment of the Robotic Package Lifting Assembly (RPLA) 100. FIG. 1A shows a cross-sectional view taken along line A-A and FIG. 1B shows a cross-sectional view taken along line B-B. RPLA 100 includes a robotic support bracket 102, which includes a plurality of attachment points. Lead screw shaft 105 passes through robotic support bracket 102 and provides for driving force to raise and lower RPLA 100 along lead screw shaft 105. This provides for Z-axis movement. The RPLA 100 further includes a first gripper side mount 106 and second gripper side mount 107. A circuit board assembly 110 includes the microprocessor components for receiving signals from a main control center and storing information concerning position. This may also be referred to as a control system and may include other circuitry or computers interconnected with the RPLA 100.

Underneath robotic support bracket 102 is lift platform plate 112 providing support to the platform that lifts the packages to be retrieved. Gripper pulley 116 is interconnected to clutch 115 and together provide driving control for a pair of grippers or gripper bars 130. The grippers 130 are configured such that they move in unison together to grip an object evenly from both sides. This ensures that the package or object will be gripped and closed on evenly from both sides. Gripper cross side 136 provides a side for the gripping function to keep grippers 130 square/perpendicular. Grabber belt 120 on grabber pulleys 121 ensure that the advancement and retraction of the gripper bars 130 is unified. This is due to the pulley connection to the bracket that the gripper bars 130 may be bolted to. This also limits the number of independent motors needed. The gripper bars 130 are configured to grip and pull an object a short distance onto conveyer belt 125. Conveyer belt 125 provides for the centering of the package on the RPLA 100. Belt motor 180 powers the conveyer belt 125. Encoders may be attached or coupled to the pulleys 121 to determine position and/or location.

Photo beam sensors (not shown) are provided to indicate the position or location of the box and may help position the box in the center of the conveyer belt resting area. For example, the photo beam sensors may be located on the ends of the gripper bars 130. This would indicate when the box has entered the conveyer belt resting area and when the conveyer belt has pulled the box onto the robot. It also allows the robot to re-position the box when the box crosses the back photo beam sensor towards the center of the conveyer belt resting area. In some embodiments this is needed since the conveyer belt 125 may not evenly grab every package. For example, in another embodiment, one of the gripper bars may be stationary and the other gripper bar may move. In this instance, the moving gripper bar would move the package onto the conveyer belt 125, which together would center the package on the conveyer belt 125. A proximity sensor 135 is provided to place a ceiling on vertical displacement of the robot.

Figure 2:
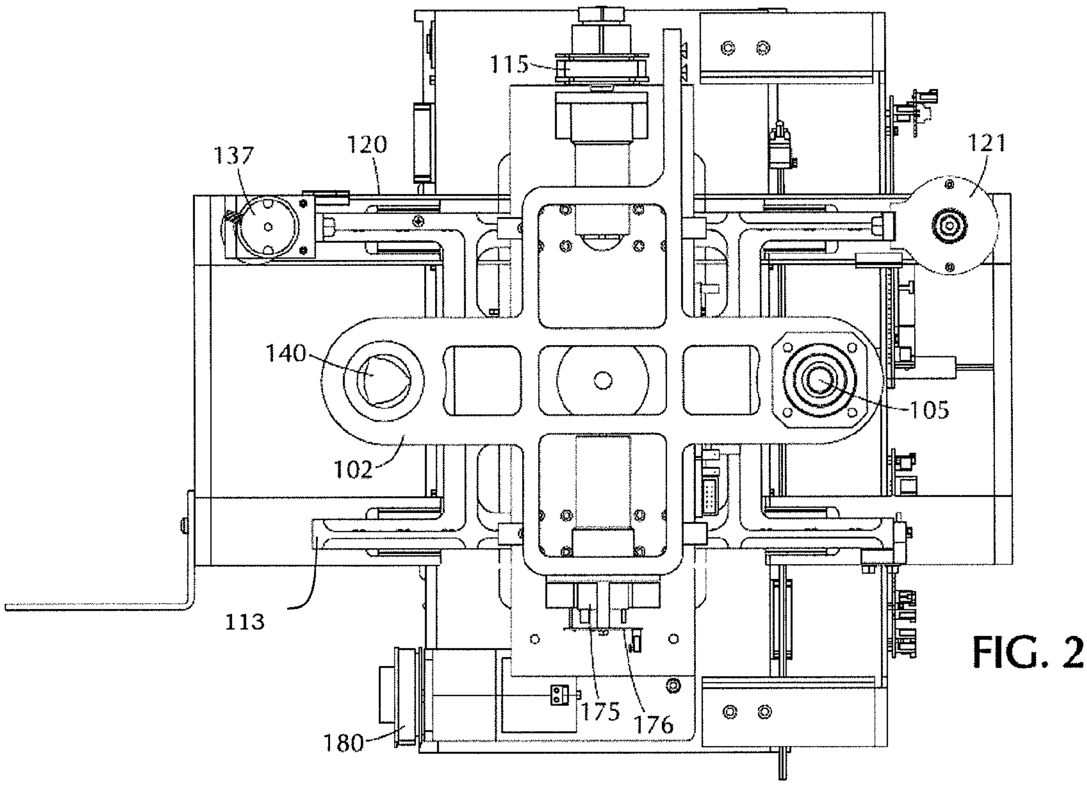
FIG. 2 shows a bottom view of the RPLA of FIG. 1.

FIG. 2 shows a bottom view of the RPLA 100. Visible here are the alignment of lead screw shaft 105 and accompanying vertical support 140 in robotic support bracket 102. The screw shaft 105 includes a screw pattern that is not visible in FIG. 2. As the screw shaft 105 is turned it will power the RPLA 100 in the Z-axis direction. A motor 137 for driving grabber belt 120 is visible. The motor 137 is attached to "H" shaped bracket 113. Float motor Cam 175 and float motor sensor 176 are visible in this view and provide sensing for the movement of the gripper bars 130. That is, the float motor Cam 175 and float motor sensor 176 assist in centering the box in the conveyer belt resting area or "float" area. Belt motor 180 powers the conveyer belt 125.

Figure 3:
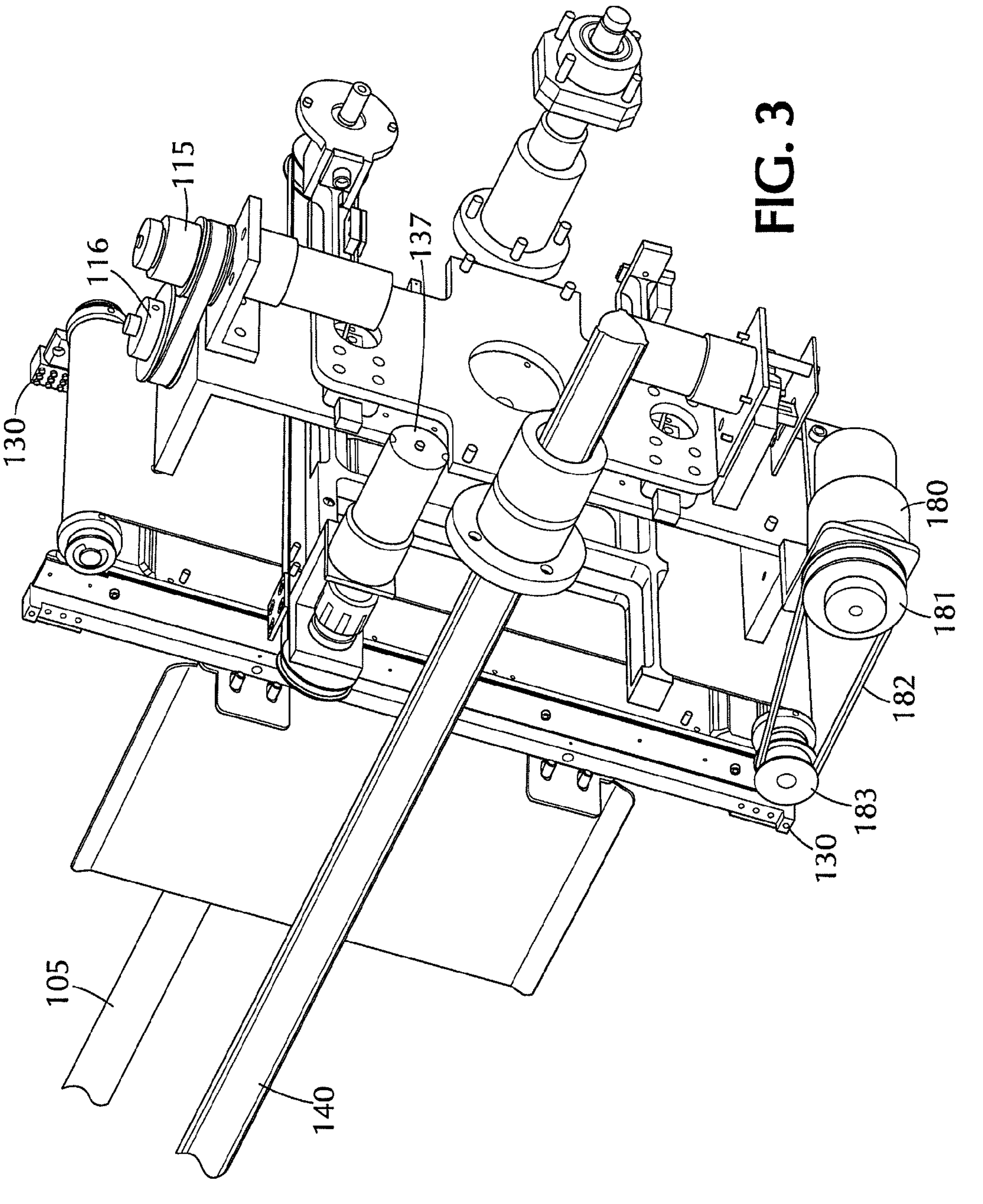
FIG. 3 shows of cut away view of the RPLA of FIG. 1.

FIG. 3 shows an additional view of RPLA 100. More of the coverings and elements have been cut away to reveal more workings of RPLA 100. Motor 137 drives gripper bars 130 to extend past the conveyer belt 125 to initiate grabbing. This drives the gripper bars 130 in either the positive or negative Y-axis direction and works in concert with the gripper system of the RPLA 100. The gripper system may include first gripper side mount 106 and second gripper side mount 107, gripper bars 130 and bracket 113. Belt motor 180 drives belt pulley 181, which in turn drives belt 182, which further in turn drives belt pulley 183, which is integrated into the conveyer belt roller of conveyer 125. This causes the conveyer belt 125 to be driven.

Figure 4:
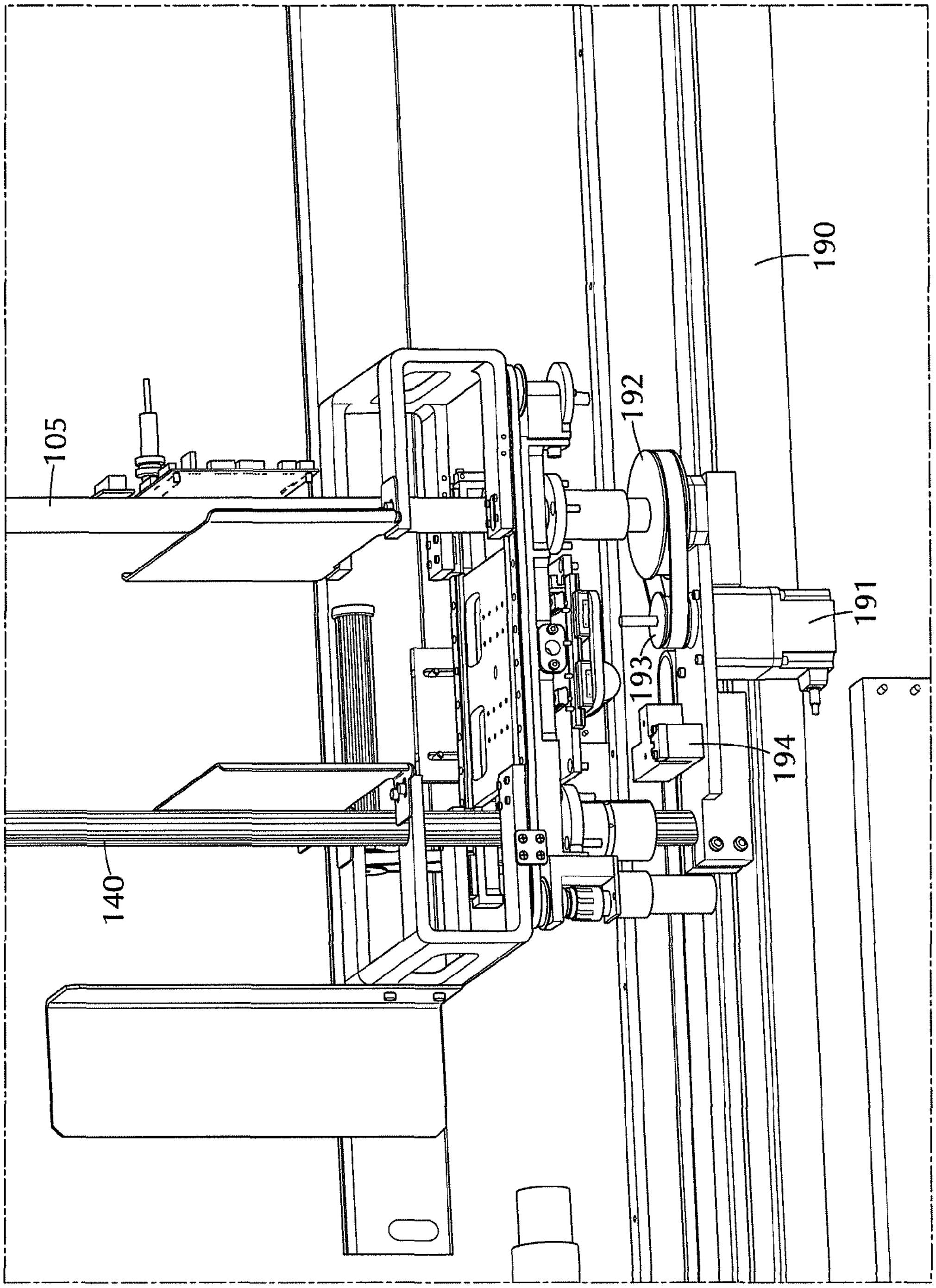
FIG. 4 shows the lifting portion of FIG. 1, integrated into a rail movement system.

FIG. 4 shows the RPLA 100 situated on rail 190 using rail clamp 191. A driving pulley 192 and motor pulley 193 raises and lowers the robotic support bracket 102. The lead screw shaft 105 has screwing on it (not shown) and as it is rotated it will raise the robotic support bracket 102. A rotational encoder tracks the turns of the lead screw shaft 105. In this way the position of the RPLA 100 may be known based on the number of rotations in each direction. The vertical support 140 may have a hydraulic braking mechanism included to assist in braking and holding the RPLA 100 in place.

Figure 5:
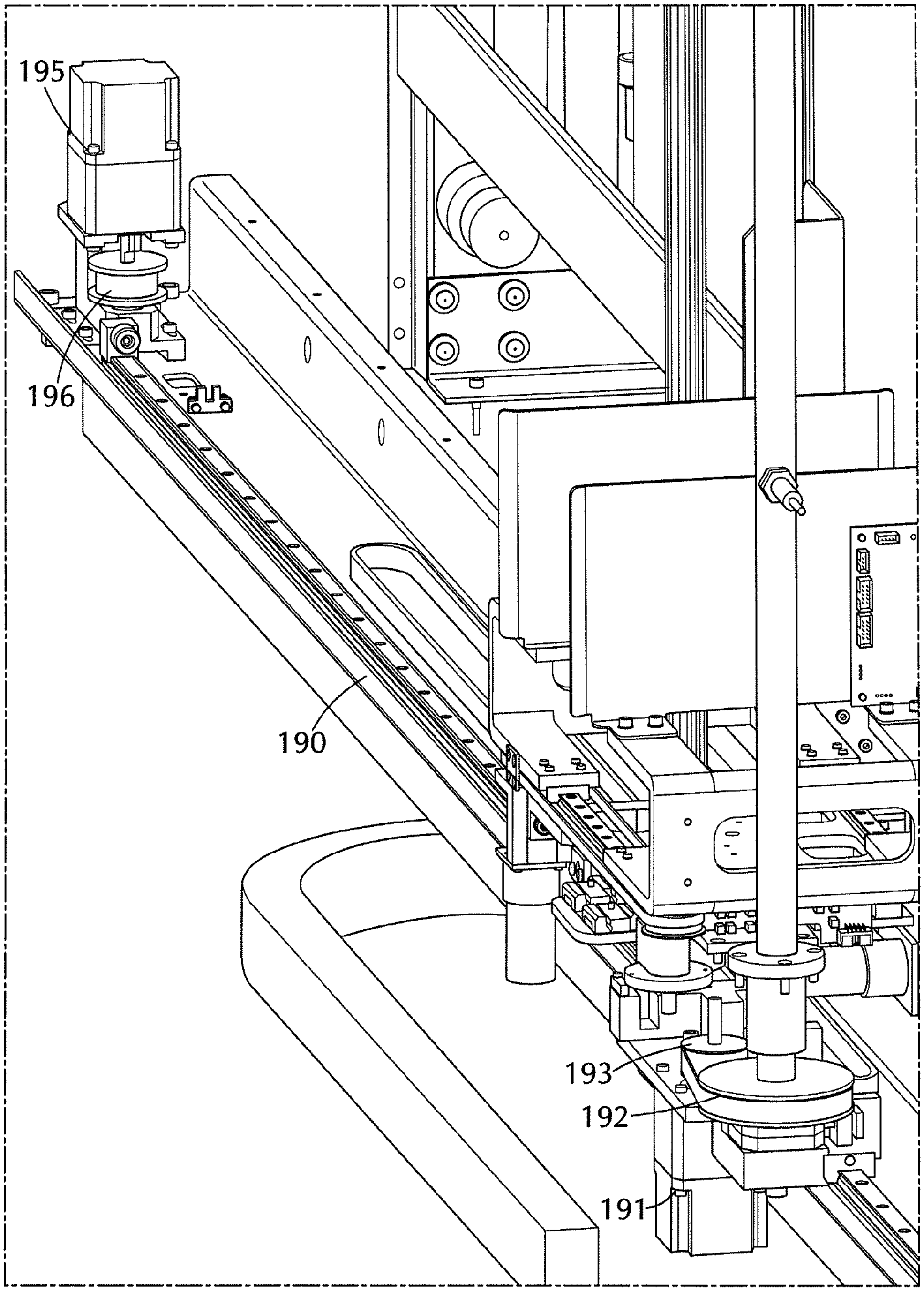
FIG. 5 shows the RPLA of FIG. 1, integrated into a rail movement system.

FIG. 5 shows RPLA 100 on rail 190. At either end of the rail 190 there may be a motor 195 and a driving pulley 196. The pulley 196 may include an encoder and/or a separate encoder may be located at the opposite end. Using this encoder, the position of the RPLA 100 may be tracked in relation to the slots for packages. This provides for the system to be driven between and along shelving or other slots in the X-axis direction.

Figure 6:
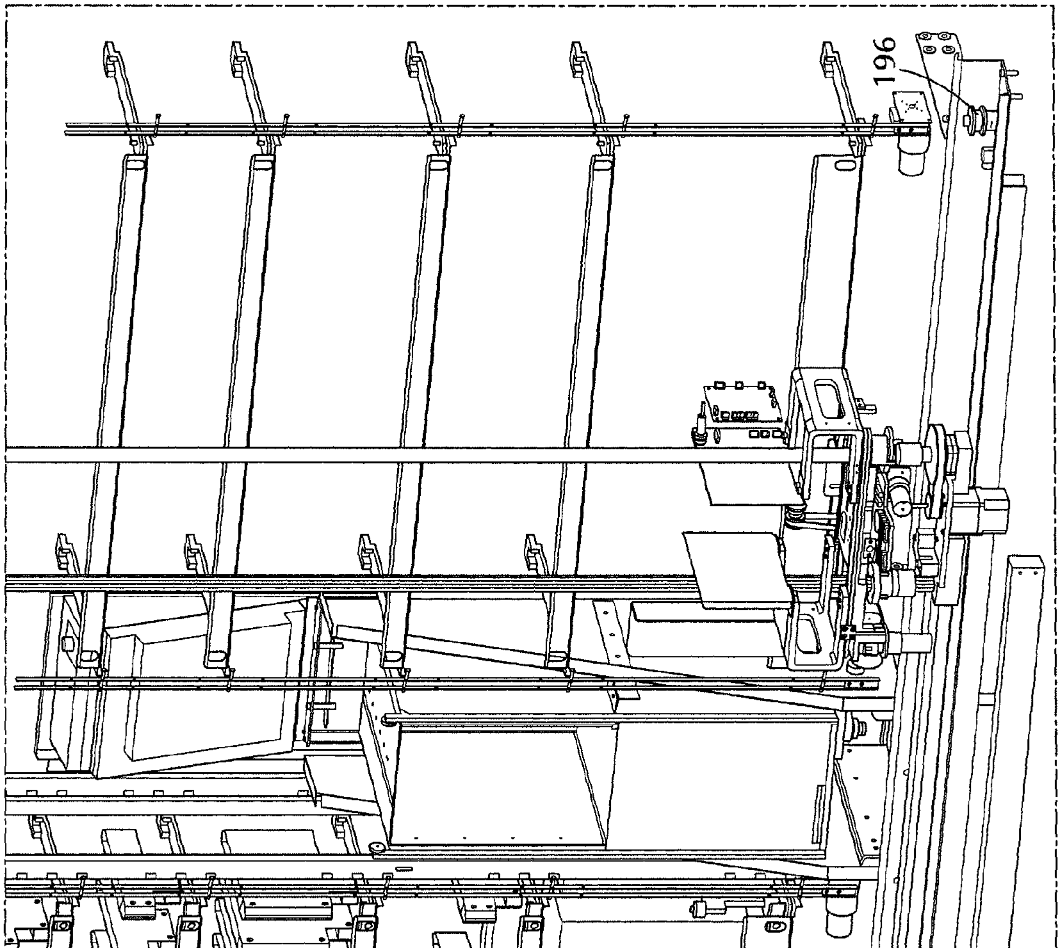
FIG. 6 shows another view of the RPLA of FIG. 1.

FIG. 6 shows a complete view of the RPLA 100. At either end of a rail 190 there may be a motor 195 and a driving pulley 196. In this view a shelving system can be seen in the background. The RPLA 100 is configured to have the position of the slots in the shelving or other storage area preprogrammed into the control system of the RPLA 100. The position of a package may be recorded in terms of the rotational movement of the encoders. Alternatively, the location may be coded by releasing the drive mechanism of the RPLA 100 and positioning the RPLA 100 at a slot. Then an indication can be sent to the control system that the RPLA 100 is at a slot and the slot location can be recorded.

With reference to FIGS. 1-6, the principles of operation of RPLA 100 include positional movement of the RPLA 100 in an X-Z plane. FIG. 6 shows an example of a plane that the RPLA 100 may move along. This process simplifies the movement and control of the RPLA 100. The grippers 130 move in a unified fashion for producing the initial movement of a package from a shelf and the conveyer belt 125 acts as the primary conveyer for a package. In operation, encoders record the position of a package when it is placed in a slot. The encoders record the position along the X and Z axis of the plane of travel of the RPLA 100. These encoders are rotational encoders and therefore are situated to count the rotations of a motor or pulley, such as motor 195 and driving pulley 196. This rotation is recorded by the computing system running the RPLA 100 and therefore linked to a position of a package.

The RPLA 100 includes a number of movement sub-systems. An x-axis movement subsystem moves the RPLA along the x-axis of the plane of movement. The x-axis movement subsystem may include a rail 190, a motor 195, and an encoder for sensing the movement of the RPLA. The RPLA may include a z-axis movement subsystem. The z-axis movement subsystem may include a vertically oriented rail, pole, or other support such as vertical support 140. Also included is a motor for driving the RPLA 100 up the vertically oriented support. This may, for example, be screw shaft or lead screw 105. An encoder tracks the position of the RPLA. The X and Z axis position provides for the position of a package or object as it is placed into shelving. The RPLA also includes a gripper subsystem. The gripper subsystem includes arms that move in perpendicular to the X-Z plane of movement. This may be, for example, grippers 130. A motor system accomplishes this movement. This may be, for example, motor 137. A second system provides for uniform gripping of the arms along the X axis. This may be, for example, gripper pulley 116 and clutch 115. The gripper subsystem may move in either direction in the positive Y or negative Y direction. In this way, the gripper subsystem may access shelving on either side of X-Z plane of travel.

Another subsystem includes a conveyer belt subsystem which may include conveyer belt 125. The belt 125 is oriented on the RPLA 100 and provides for the movement of an object on the belt 125 in the X axis direction. The belt subsystem functions in concert with the gripper subsystem to remove and accept packages or objects that are located at a particular X and Z axis position. The gripper subsystem extends to grab the package and pull it a sufficient distance so that the belt subsystem can move the package onto the RPLA 100. The RPLA 100 then may move to a new position and deposit the package by use of the belt subsystem.

The two above mentioned subsystems work together to grip and center the package or object. The gripper subassembly and the conveyor subassembly, have a side to side, frictionless or very low friction movement, on lift platform plate 112. This "float" distance matches the maximum clearance of a package to the width of the slot. Therefore a package that is off-centered can be gripped with even pressure from both arms as described herein. This left to right motion is locked in the center position by a motor and cam, such as for example, float motor Cam 175 and float motor sensor 176, or by a cylinder pair, while the machine moves to the desired slot. Upon arrival to the slot, the locking action is released. As the gripper bars 130 closes on a package that is not perfectly centered in the slot, the gripper assembly and receiving conveyor move either left or right as the gripper bars 130 engage. Once the package is retrieved, the lift platform plate 112 is re-centered, and the robot moves with the package to the center position of the next shelf for storage.

The RPLA 100 encodes the position of packages and slots by using the encoders. By counting the revolutions of a pulley or the vertically oriented support, the position of the RPLA 100 may be translated and recorded. Therefore, the precise positioning of a package may be known. During an initial setup, a memory portion of a circuit or processor controlling the RPLA 100 may be initialized or taught the positions of the position of slots. In one embodiment, the shelf positions are at standard preprogrammed heights and slots in the shelves at standard locations. In another embodiment, the motors of the RPLA 100 may be disengaged and the RPLA robotic support bracket portion may manually aligned with a slot and an indication may be sent to the circuit or processor controlling the RPLA 100.

The operation of the RPLA 100 may be implemented in a kiosk with shelving on either side of the kiosk. The kiosk includes a control mechanism for retrieving packages according to user commands. Since the RPLA 100 stores the position of certain packages it may automatically retrieve them in response to user commands. This can be utilized by entering into the system a particular code for a package which the RPLA 100 can then retrieve according to the recorded store position.

In general, a package retrieving apparatus includes a track, a base slidably interconnected with the track and a vertical support interconnected with the base. The package retrieving apparatus further includes a package picker module oriented on the vertical support to vertically move on the vertical support. Moreover the package picker module includes a first and second gripper and a conveyer belt. The conveyer belt being oriented in a plane parallel to the ground and the first and second gripper oriented parallel to the conveyer belt. The first and second gripper is configured to move parallel to the conveyer belt to surround an object and grip the object beyond the surface of the conveyer belt. The gripping of the first and second gripper may be driven by a pulley system that configures each of the first and second gripper to move in unison and at the same rate, such that the package is centered during the gripping.

The package retrieving apparatus may further include first and second encoders that provide an X and Z position. The first encoder may be integrated or orientated with a X-position pulley mechanism. The X-position pulley mechanism may include a first motor and a first belt, where the first belt runs along the track and is interconnected with the base. The second encoder may be integrated with or oriented in a Z-position pulley mechanism. The Z-position pulley mechanism may include a second motor and a second belt, and is configured to rotate the vertical support. The second encoder may be provided for the raising and lowering of the base and record a second position of the base. The first and second encoder may sense rotational movement with the first encoder providing a first rotational movement signal to a control system and the second encoder providing a second rotational movement signal to the control system. The control system may store a position of the object, the position being a record of the first and second rotational movement signals. The control system may include preprogrammed positions for slots to receive the object. In one alternative, the control system may be configured to record the position of the object in a one of the slots after placing the object.

The package picker module may be configured to extend the first and second gripper in a Y-axis direction, grip the object by moving the first and second gripper closer together, and pull the object to the conveyer belt. The conveyer belt may rotate in the Y-Axis direction and convey the object to a resting point on the conveyer belt.

The vertical support may have a screw shaped outer surface and the turning of the vertical support provides for the raising and lowering of the base. The package retrieving apparatus may further include a secondary vertical support and a braking mechanism located on the base configured to provide braking of the secondary vertical support.

In general, a method of retrieving packages includes providing a package retrieving apparatus. The package retrieving apparatus may include a track, a base slidably interconnected with the track, and a vertical support interconnected with the base. The package picker module may be oriented on the vertical support to move up and down the vertical support. The package picker module may include a first and second gripper and a conveyer belt. The conveyer belt may be oriented in a plane parallel to the ground and the first and second gripper may be oriented parallel to the conveyer belt. The first and second gripper may be configured to move parallel to the conveyer belt to surround an object and grip the object beyond the surface of the conveyer belt. The gripping of the first and second gripper may be driven by a pulley system that configures each of the first and second grippers to move in unison and at the same rate, such that the object is centered during the gripping.

The package picker module may then be positioned in line with a slot. The first and second gripper may then be extended to grip an object and retract. The conveyer belt may then be activated to move the object onto a center of the package picker module. In another embodiment, the package picker module may be positioned in line with a deposit site and activated to move the object to the deposit site.

The package retrieving apparatus may include a first and second encoder. The first and second encoder may be integrated such that they provide an X and Z position. The first encoder may be oriented in a X-position pulley mechanism, where the X-position pulley mechanism includes a first motor and a first belt running along the track and interconnected with the base. The second encoder may be oriented in a Z-position pulley mechanism, where the Z-position pulley mechanism may include a second motor and a second belt configured to rotate the vertical support and the second encoder providing for the raising and lowering of the base and recording a second position of the base. The positioning includes driving the first and second motor.

In another embodiment, the package picker module may be configured to extend the first and second gripper in an Y-axis direction, grip the object by moving the first and second gripper closer together, pull the object to the conveyer belt. The conveyer belt may be rotating in the Y-Axis direction and conveying the object to a resting point on the conveyer belt.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein, but is intended to cover modifications within the spirit and scope thereof as defined by the appended claims and any and all equivalents thereof. Note that, although particular embodiments are shown, features of each attachment may be interchanged between embodiments.

What is claimed is:

1. A package retrieving apparatus for use with a package storage and delivery system having a plurality of shelves configured to hold packages and having shelf lengths extending in an X-axis direction and shelf widths extending in a Y-axis direction, each of the plurality of shelves spaced from each other vertically in a Z-axis direction that is perpendicular to the Y-axis direction and the X-axis direction, the package retrieving apparatus comprising:

a track extending in the X-axis direction;

a screw shaft extending in the Z-axis direction and configured to rotate about a screw shaft axis;

a base slidably interconnected with the track and configured to move in the X-axis direction;

a vertical support extending in the Z-axis direction, coupled to the base and configured to move with the base in the X-axis direction; and a package lifting assembly coupled to the base and configured to move with the base in the X-axis direction and in the in the Z-axis direction, the package lifting assembly comprising:

a support bracket having a space configured to allow the screw shaft to pass therethrough in the Z-axis direction;

a conveyer subassembly having a conveyer belt configured to move the packages in the X-axis direction;

a gripper subassembly having a first gripper and a second gripper, the first and second gripper each having gripper portions disposed above the conveyor belt opposite the support bracket and configured to move in the Y-axis direction toward and away from the shelves and relative to the conveyer belt and at least one of the gripper portions is configured to move in the X-axis direction relative to the conveyer belt to grip and release each of the packages, wherein the conveyer belt extends across a center point between the first gripper portion and the second gripper portions;

the gripper subassembly and the conveyer subassembly are configured to move together in the X-axis direction relative to the support bracket, and the package lifting assembly is configured to move in the Z-axis direction when the screw shaft rotates.

2. The package retrieving apparatus of claim 1, wherein the gripping of the first gripper and the second gripper are driven by a pulley system that configures each of the first gripper and the second gripper to move in unison and at the same rate, such that each of the packages is centered during the gripping.

3. The package retrieving apparatus of claim 1, wherein the package lifting assembly is configured to extend the first and second gripper in the Y-axis direction, grip the package by moving the first gripper and the second gripper closer together in the X-axis direction, pull the package to the conveyer belt, the conveyer belt conveying the package in the Y-axis direction to a resting point on the conveyer belt.

4. The package retrieving apparatus of claim 1, wherein the vertical support has a screw shaped outer surface and the turning of the vertical support provides for the raising and lowering of the base.

5. The package retrieving apparatus of claim 1, further including a secondary vertical support and a braking mechanism located on the base configured to provide braking of the secondary vertical support.

6. The package retrieving apparatus of claim 1, wherein the shelves comprise slots each configured to hold one of the packages, when the package lifting assembly moves between the one or more slots, the gripper subassembly and the conveyer subassembly are in a package lifting assembly center position, and when the gripper portions are extended in the Y direction toward a package that is not centered in one of the slots, the gripper subassembly and the conveyer subassembly are controlled to move together in the X direction relative to the support bracket to retrieve the package.

7. The package retrieving apparatus of claim 1, further comprising:

a first and second encoder configured to provide an X and Z position.

8. The package retrieving apparatus of claim 7, wherein the first encoder is oriented in a X-position pulley mechanism, the X-position pulley mechanism including a first motor and a first belt, the first belt running along the track and interconnected with the base.

9. The package retrieving apparatus of claim 8, wherein the second encoder is oriented in a Z-position pulley mechanism, the Z-position pulley mechanism includes a second motor and a second belt, the Z-position pulley mechanism configured to rotate the screw shaft and the second encoder providing for the raising and lowering of the base and record a second position of the base.

10. The package retrieving apparatus of claim 9, wherein the first and second encoder sense rotational movement, wherein the first encoder provides a first rotational movement signal to a control system and the second encoder provides a second rotational movement signal to the control system.

11. The package retrieving apparatus of claim 10, wherein the control system stores a corresponding position of the one or more packages on the plurality of shelves, the corresponding position being a record of the first and second rotational movement signals.

12. The package retrieving apparatus of claim 10, wherein the control system includes preprogrammed positions for slots to receive the packages.

13. The package retrieving apparatus of claim 12, wherein, the control system is configured to record the position of the package in one of the slots after placing the package in the one slot.

14. A method of distributing packages within a package storage and delivery system comprising a plurality of shelves having slots configured to hold the packages, the shelves having shelf lengths extending in an X direction and shelf widths extending in a Y direction, the shelves spaced from each other vertically in a Z direction perpendicular to the Y direction and the X direction, the method comprising:

moving, in the X direction, a package lifting assembly coupled to a base slidably interconnected with a track extending in the X direction;

moving, in the Z direction, the package lifting assembly when a screw shaft, extending in the Z direction through a space in the package lifting assembly, rotates about a screw shaft axis;

positioning the package lifting assembly in line with a slot;

extending a first gripper and a second gripper of a gripper subassembly of the package lifting assembly in the Y direction toward the slot;

moving at least one of the first gripper and the second gripper in the X direction relative to a conveyor belt of a conveyer subassembly;

moving the conveyor belt subassembly and the gripper subassembly together in the X direction from a package lifting assembly center position to a position to grip the package when it is determined that the package is not centered in the slot, retracting the first gripper and the second gripper in the Y direction away from the slot; and activating the conveyer belt to move the package in the Y direction toward the package lifting assembly.

15. The method of claim 14, further comprising:

positioning the package lifting assembly in line with a deposit site; and activating the conveyer belt to move the package to the deposit site.

16. The method of claim 15, wherein the gripping of the first and second gripper are driven by a pulley system that configures each of the first and second gripper to move in unison and at the same rate, such that the package is centered during the gripping.

17. The method of claim 16, wherein the package retrieving apparatus includes a first and second encoder, the first and second encoder providing an X and Z position, the first encoder being oriented in a X-position pulley mechanism, the X-position pulley mechanism further including a first motor and a first belt, the first belt running along the track and interconnected with the base, and the second encoder being oriented in a Z-position pulley mechanism, the Z-position pulley mechanism including a second motor and a second belt, the Z-position pulley mechanism configured to rotate the screw shaft and the second encoder providing for the raising and lowering of the base and record a second position of the base.

18. The method of claim 15, wherein the package lifting assembly is configured to extend the first and second gripper in an Y-axis direction, grip the package by moving the first and second gripper closer together, pull the package to the conveyer belt, the conveyer belt rotating in the Y-Axis direction, the conveyer belt conveying the package to a resting point on the conveyer belt.

19. The method of claim 18, wherein the vertical support has a screw shaped outer surface and the turning of the vertical support provides for the raising and lowering of the base.

20. The method of claim 19, wherein the package retrieving apparatus further includes a secondary vertical support and a braking mechanism located on the base configured to provide braking of the secondary vertical support.

21. The method of claim 20, wherein the positioning includes moving the X and Z position of the package lifting assembly only.

* * * * *